United States Patent
Rakshit et al.

(10) Patent No.: US 11,188,154 B2
(45) Date of Patent: Nov. 30, 2021

(54) CONTEXT DEPENDENT PROJECTION OF HOLOGRAPHIC OBJECTS

(71) Applicant: International Business Machines Corporation, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 15/992,775

(22) Filed: May 30, 2018

(65) Prior Publication Data

US 2019/0369736 A1  Dec. 5, 2019

(51) Int. Cl.
*G06F 3/01* (2006.01)
*G06F 3/0481* (2013.01)
*G03H 1/00* (2006.01)
*H04L 29/08* (2006.01)
*H04B 1/3827* (2015.01)

(52) U.S. Cl.
CPC .......... *G06F 3/017* (2013.01); *G03H 1/0005* (2013.01); *G06F 3/04815* (2013.01); *G06F 3/04817* (2013.01); *H04B 1/385* (2013.01); *G03H 2001/0061* (2013.01); *G03H 2210/30* (2013.01); *H04L 67/10* (2013.01)

(58) Field of Classification Search
CPC .. G06F 3/017; G06F 3/04815; G06F 3/04817; G03H 1/0005; G03H 2001/0061; G03H 2210/30; H04B 1/385; H04L 67/10
See application file for complete search history.

(56) References Cited

U.S. PATENT DOCUMENTS

| | | | | |
|---|---|---|---|---|
| 6,028,593 A * | 2/2000 | Rosenberg | ............ | A63F 13/285 345/156 |
| 6,031,519 A * | 2/2000 | O'Brien | ............... | G03H 1/0005 345/156 |
| 6,614,422 B1 * | 9/2003 | Rafii | ..................... | G06F 1/1626 345/156 |
| 6,771,294 B1 * | 8/2004 | Pulli | ...................... | G06F 3/017 715/863 |
| 7,054,045 B2 * | 5/2006 | McPheters | ........... | G03H 1/0005 341/23 |
| 7,084,857 B2 * | 8/2006 | Lieberman | .............. | G06F 3/011 345/158 |
| 7,782,299 B2 * | 8/2010 | Ogino | ................... | G06F 3/0346 345/158 |
| 8,089,456 B2 * | 1/2012 | Grego | ................... | G06F 3/0426 345/156 |
| 8,243,015 B2 * | 8/2012 | Lieberman | .......... | G06F 3/04886 345/156 |

(Continued)

*Primary Examiner* — Jeremy L Stanley
(74) *Attorney, Agent, or Firm* — Stephanie L. Carusillo

(57) ABSTRACT

A computing device associated with a user obtains contextual data associated with the user. The contextual data includes information indicating a current location of the user relative to the computing device. The computing device selects one or more applications provided by the computing device based on results of an analysis of the contextual data, and projects one or more holographic objects representing the one or more applications into a viewable area located a predetermined distance from the user.

20 Claims, 6 Drawing Sheets

(56) References Cited

U.S. PATENT DOCUMENTS

| | | | | |
|---|---|---|---|---|
| 8,279,168 B2* | 10/2012 | Glomski | G06F 3/04842 | 345/156 |
| 8,316,324 B2* | 11/2012 | Boillot | G06F 3/0481 | 715/863 |
| 8,972,878 B2* | 3/2015 | Mohler | G06F 3/04817 | 715/765 |
| 9,158,959 B2* | 10/2015 | Macho | G06K 9/00087 | |
| 9,299,183 B2* | 3/2016 | Vesely | G06F 3/04815 | |
| 9,367,136 B2* | 6/2016 | Latta | G06F 3/016 | |
| 9,377,858 B2* | 6/2016 | Kim | G06F 3/016 | |
| 9,459,758 B2* | 10/2016 | Berenson | G06F 3/04815 | |
| 9,625,996 B2* | 4/2017 | Kim | G06F 3/0426 | |
| 9,711,025 B1* | 7/2017 | Herbert | G08B 21/02 | |
| 9,756,301 B2* | 9/2017 | Li | G06F 3/042 | |
| 9,766,806 B2* | 9/2017 | Bennet | G06F 3/013 | |
| 9,767,613 B1* | 9/2017 | Bedikian | G06F 3/147 | |
| 9,933,854 B2* | 4/2018 | Kandur Raja | G06F 3/017 | |
| 9,965,033 B2* | 5/2018 | Park | G06F 3/014 | |
| 9,971,399 B2* | 5/2018 | Lee | G04G 9/0064 | |
| 10,140,776 B2* | 11/2018 | Schwarz | G06T 19/20 | |
| 10,152,953 B2* | 12/2018 | Nakao | G06F 3/0304 | |
| 10,198,030 B2* | 2/2019 | Burch | G06F 3/017 | |
| 10,275,098 B1* | 4/2019 | Clements | G06F 3/011 | |
| 10,281,987 B1* | 5/2019 | Yang | G06F 3/04847 | |
| 10,282,451 B1* | 5/2019 | Ho | G06F 16/909 | |
| 10,353,532 B1* | 7/2019 | Holz | G06F 3/0482 | |
| 10,416,834 B1* | 9/2019 | Holz | G06F 3/04815 | |
| 10,649,534 B2* | 5/2020 | Lee | G06F 3/011 | |
| 10,672,187 B2* | 6/2020 | Nagano | G06F 3/0325 | |
| 10,732,808 B2* | 8/2020 | Fukazawa | G06F 3/147 | |
| 2003/0010543 A1* | 1/2003 | Montagnino | G01G 19/44 | 177/177 |
| 2004/0108990 A1* | 6/2004 | Lieberman | G06F 3/0426 | 345/156 |
| 2004/0201823 A1* | 10/2004 | Raskar | G06T 7/74 | 353/69 |
| 2005/0002074 A1* | 1/2005 | McPheters | G03H 1/0005 | 359/15 |
| 2007/0103341 A1* | 5/2007 | Kreiner | G08G 1/202 | 340/988 |
| 2008/0018591 A1* | 1/2008 | Pittel | G06F 3/0426 | 345/156 |
| 2009/0109176 A1* | 4/2009 | Fein | G06F 3/048 | 345/158 |
| 2009/0113348 A1* | 4/2009 | Fein | G03H 1/2294 | 715/848 |
| 2009/0327871 A1* | 12/2009 | Wolf | G09G 5/005 | 715/243 |
| 2010/0039379 A1* | 2/2010 | Hildreth | G06F 3/0418 | 345/156 |
| 2010/0093399 A1* | 4/2010 | Kim | H04M 1/0202 | 455/566 |
| 2010/0199232 A1* | 8/2010 | Mistry | G06F 3/0425 | 715/863 |
| 2010/0289740 A1* | 11/2010 | Kim | G06F 3/0414 | 345/157 |
| 2011/0134074 A1* | 6/2011 | Norieda | G06F 3/045 | 345/174 |
| 2011/0154249 A1* | 6/2011 | Jang | H04M 1/0272 | 715/781 |
| 2011/0248963 A1* | 10/2011 | Lawrence | G03H 1/0005 | 345/175 |
| 2012/0038592 A1* | 2/2012 | Shyu | G06F 3/0426 | 345/175 |
| 2012/0056819 A1* | 3/2012 | Peterson | G06F 3/0237 | 345/173 |
| 2012/0090005 A1* | 4/2012 | Marlow | G06Q 30/0241 | 725/42 |
| 2012/0113018 A1* | 5/2012 | Yan | H04N 13/302 | 345/173 |
| 2012/0170089 A1* | 7/2012 | Kim | G06F 3/04883 | 359/9 |
| 2012/0194477 A1* | 8/2012 | Krah | G02B 30/56 | 345/175 |
| 2012/0209839 A1* | 8/2012 | Andrews | G06Q 10/10 | 707/728 |
| 2012/0223909 A1* | 9/2012 | Tse | G06F 3/017 | 345/174 |
| 2012/0249409 A1* | 10/2012 | Toney | G06F 3/017 | 345/156 |
| 2013/0014006 A1* | 1/2013 | Abellera | G06F 3/04817 | 715/234 |
| 2013/0086531 A1* | 4/2013 | Sugita | G06F 3/0346 | 715/863 |
| 2013/0106842 A1* | 5/2013 | Miyazawa | G06F 3/041 | 345/419 |
| 2013/0187950 A1* | 7/2013 | Nowatzyk | G09G 3/003 | 345/633 |
| 2013/0302763 A1* | 11/2013 | Edwards | G09B 5/02 | 434/159 |
| 2014/0029789 A1* | 1/2014 | DeLean | G06K 9/20 | 382/103 |
| 2014/0162730 A1* | 6/2014 | Kim | H04M 1/72597 | 455/566 |
| 2014/0201655 A1* | 7/2014 | Mahaffey | G06F 3/04817 | 715/765 |
| 2014/0201666 A1* | 7/2014 | Bedikian | G06F 3/017 | 715/771 |
| 2014/0201681 A1* | 7/2014 | Mahaffey | H04M 1/72569 | 715/846 |
| 2014/0206418 A1* | 7/2014 | Kim | H04M 1/0266 | 455/566 |
| 2014/0237366 A1* | 8/2014 | Poulos | G06F 3/013 | 715/728 |
| 2014/0240228 A1* | 8/2014 | Juni | G06F 3/0304 | 345/156 |
| 2014/0327611 A1* | 11/2014 | Ono | G06K 9/6202 | 345/156 |
| 2014/0347295 A1* | 11/2014 | Kim | G06F 1/1643 | 345/173 |
| 2014/0356848 A1* | 12/2014 | Peterson | G09B 21/00 | 434/428 |
| 2015/0054730 A1* | 2/2015 | Kodama | G09G 3/001 | 345/156 |
| 2015/0116454 A1* | 4/2015 | Kim | G03H 1/0486 | 348/40 |
| 2015/0119074 A1* | 4/2015 | Holz | G01S 1/66 | 455/456.1 |
| 2015/0121287 A1* | 4/2015 | Fermon | G06F 3/016 | 715/773 |
| 2015/0205399 A1* | 7/2015 | Kim | G06F 3/011 | 345/175 |
| 2015/0241968 A1* | 8/2015 | Brehmer | G06F 3/0233 | 345/156 |
| 2016/0018985 A1* | 1/2016 | Bennet | G06F 3/011 | 345/175 |
| 2016/0077489 A1* | 3/2016 | Kaufman | G02B 30/56 | 359/9 |
| 2016/0091979 A1* | 3/2016 | Liu | G03H 1/0005 | 345/156 |
| 2016/0109953 A1* | 4/2016 | Desh | G06F 3/017 | 345/169 |
| 2016/0154458 A1* | 6/2016 | Liu | G03H 1/0005 | 348/40 |
| 2016/0195849 A1* | 7/2016 | Takagi | G06F 3/017 | 348/40 |
| 2016/0202873 A1* | 7/2016 | Chi | G06F 3/017 | 345/173 |
| 2016/0209928 A1* | 7/2016 | Kandur Raja | G06F 3/04886 | |
| 2016/0231822 A1* | 8/2016 | Kim | G06F 3/011 | |
| 2016/0267759 A1* | 9/2016 | Kerzner | G08B 13/19684 | |
| 2016/0364003 A1* | 12/2016 | O'Brien | G03H 1/0005 | |
| 2017/0123487 A1* | 5/2017 | Hazra | G06F 3/015 | |
| 2017/0139375 A1* | 5/2017 | Chung | G03H 1/08 | |
| 2017/0169610 A1* | 6/2017 | King | G02B 27/017 | |
| 2017/0249829 A1* | 8/2017 | Brady | G08B 7/064 | |
| 2017/0308259 A1* | 10/2017 | Regnier | G06F 3/0488 | |
| 2017/0318964 A1* | 11/2017 | McKnight | B05B 11/3052 | |

(56) References Cited

U.S. PATENT DOCUMENTS

| | | | | |
|---|---|---|---|---|
| 2018/0095645 | A1* | 4/2018 | Subudhi | G06F 3/04883 |
| 2018/0121047 | A1* | 5/2018 | Goel | G06F 3/0485 |
| 2018/0181199 | A1* | 6/2018 | Harvey | G06T 19/006 |
| 2018/0273345 | A1* | 9/2018 | Rao | B66B 1/468 |
| 2018/0286126 | A1* | 10/2018 | Schwarz | G06F 3/04845 |
| 2018/0321894 | A1* | 11/2018 | Paulovich | G03H 1/2249 |
| 2018/0334101 | A1* | 11/2018 | Tschirhart | G02B 27/0101 |
| 2018/0365898 | A1* | 12/2018 | Costa | G06F 3/0304 |
| 2018/0374143 | A1* | 12/2018 | Williamson | G06Q 30/0643 |
| 2019/0073109 | A1* | 3/2019 | Zhang | G02B 27/017 |
| 2019/0099681 | A1* | 4/2019 | Rico | A63F 13/213 |
| 2019/0102047 | A1* | 4/2019 | Anderson | G06F 3/011 |
| 2019/0121522 | A1* | 4/2019 | Davis | G02B 27/0093 |
| 2019/0156715 | A1* | 5/2019 | James | G06F 3/147 |
| 2019/0318501 | A1* | 10/2019 | Balan | A63F 13/211 |
| 2019/0318609 | A1* | 10/2019 | Obayuwana | G08B 25/016 |
| 2020/0066059 | A1* | 2/2020 | Ghatak | G06F 3/011 |
| 2020/0341610 | A1* | 10/2020 | Quintana | G06F 3/0488 |

\* cited by examiner

CONTEXT DEPENDENT PROJECTION OF HOLOGRAPHIC OBJECTS

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to projecting holographic images, and more particularly to projecting holographic images based on a current context.

Description of Related Art

Current computing and communication devices commonly display user selectable objects, and accept user interaction with displayed objects, using various types of screen technologies. For example, a smart phone, tablet, or other mobile device, typically displays icons for installed applications on a touch screen. When a user activates, or otherwise interacts with one of the displayed icons, the device launches the application associated with that icon.

One of the drawbacks to the use of conventional touch screens, or other types of screen displays, is that occasions arise in which a user of the device is not close enough to the device to interact with the screen in a timely manner. For example, a phone placed on a table near the user may start to ring, but the user may not be able to reach the phone in time to answer the telephone by interacting with an icon on the touchscreen. In other situations, the user may forego interacting with her mobile device because the device is not conveniently within reach.

In addition to screen displays, some computing devices use holographic projections. Currently available holographic projection technology provides a different way of displaying objects for user interaction, but currently available holographic display techniques suffer from some of the same shortcomings inherent in touch screen and other fixed display types. Thus, it is apparent that current interactive display techniques are less than perfect.

BRIEF DESCRIPTION OF THE SEVERAL VIEWS OF THE DRAWING(S)

DETAILED DESCRIPTION OF THE INVENTION

Figure 1:
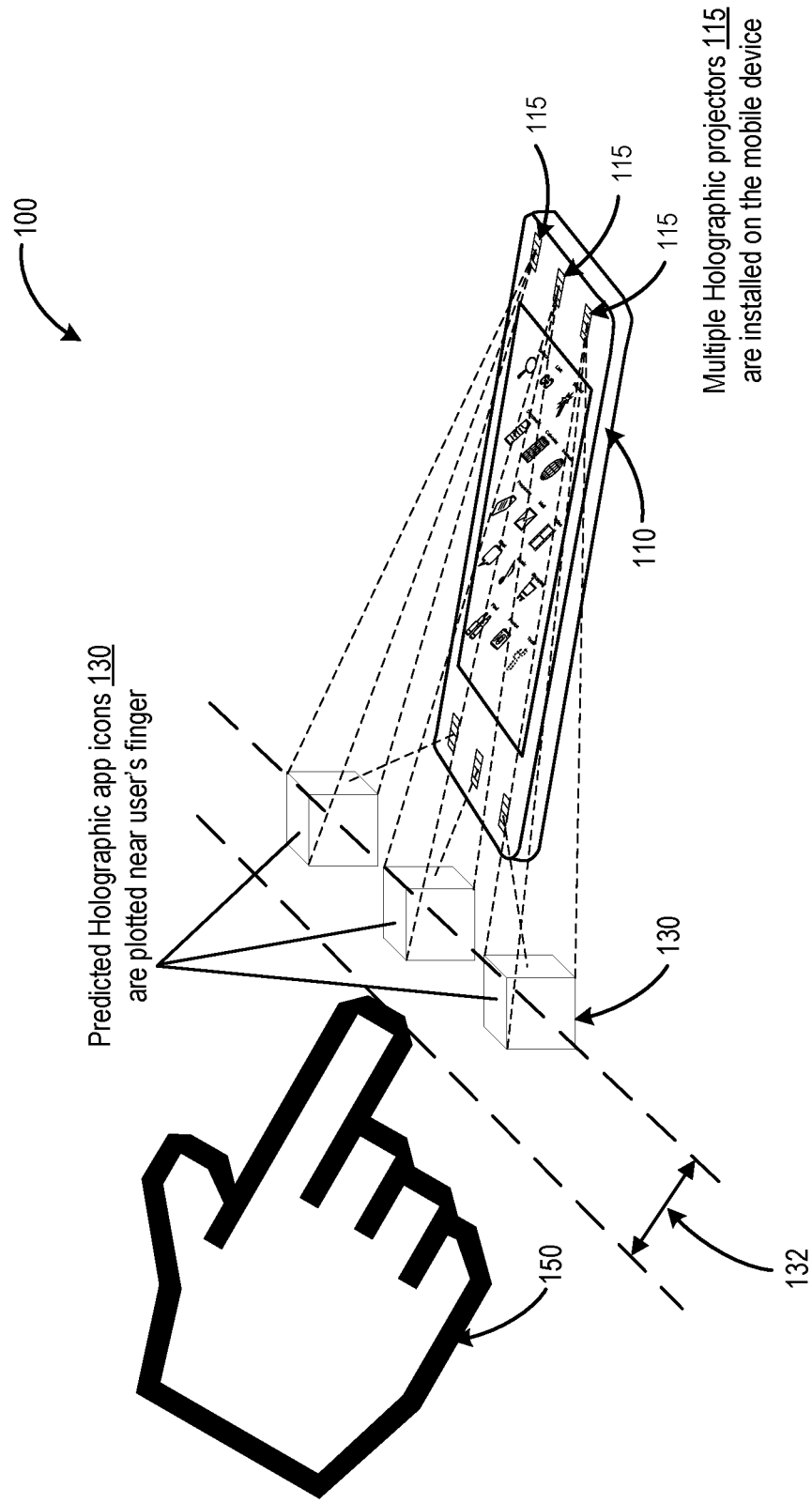
FIG. 1 is a diagram illustrating projection of holographic objects representing one or more applications a predetermined distance from a user, in accordance with various embodiments of the disclosure.

In various embodiments, a user is identified, and movement of the user's hand towards a mobile device, e.g. a smart phone or tablet, is detected. In some embodiments, the mobile device is out of reach of the user, and movement of the user's hand can be detected through use of real-time, or near real-time, input data sources, including cameras, sensors, and microphone audio included in the mobile device, using sensors and input devices included in an external device such as a wearable smart watch, or using input devices mounted in a room or area occupied by the user of the mobile device. The sensors and input devices included in the mobile device, in a wearable device, or present in an area proximate to the user, can be used to collect contextual information, or data, related to the user and the user's current surroundings and situation. In some embodiments, movement of the user's hand, as well as the user's overall position, are considered to be contextual information, or can be obtained by analyzing contextual data or information.

Contextual information, for example detection of movement of the user's hand towards the mobile device, can be used as a control action to initiate projection of 3D hologram application icons, or other objects, to the user's finger tips, where the hologram is projected to a location that is free of obstruction near the users hand, which permits the user to remotely interact with applications provided by the mobile device. In various embodiments, in cases where analysis of contextual data indicates that the user's view of the projected holographic objects may be partially obstruction by the user's hand or other environmental obstruction, the application icons will not be projected in the obstructed area. Eye direction of user and hand direction can be used for identifying the obstacle area. Eye direction of user and hand direction can be used for identifying the obstacle area. In various embodiments, eye direction of user and hand direction can be used for identifying an obstacle area.

Various embodiments described herein provide a cognitive method of predicting, ranking and clustering the most likely icons to project to the user's finger tips. In some embodiments if the user does not interact with a first cluster, or group of application icons, the next most likely set of predicted application icons will be projected to the user's finger tips.

In at least one embodiment, the holographic objects are projected to a spatial location that is a predetermined distance from a user, as opposed to a fixed distance from the mobile device. For example, a device user can set a distance of 1 inch from her fingertips, so that when the user's hand is 2 feet away from a mobile device, the holographic objects will be 1 ft. 11 in. from the device, but if the same user's hand is 4 feet away, the holographic objects will be projected 3 ft. 11 in. from the mobile device. In both cases the objects are projected 1 inch from the user's hand.

In some embodiments, analysis of contextual data may indicate that the user is experiencing an emergency. This determination of the user's current state can be made based, for example, from data obtained from cameras, sensors, biometrics, or audio input sources (e.g. audio command, passive listening, and biometrics) included in a mobile device, a smart watch, other external sensors and devices, or some combination thereof. In some cases, detection of an emergency can trigger projection of a 3D hologram associated with the emergency to a location proximate to user. This position can also be set be a predetermined distance from the user, along any axis.

Referring first to FIG. 1, a diagram 100 illustrating projection of holographic objects to a location that is a predetermined distance from a user will be discussed in accordance with various embodiments of the disclosure. FIG. 1 shows user's hand 150 moving towards mobile device 110, which triggers holographic projectors 115 to project holographic icons 130 to a location that is a predetermined distance 132 from user's hand 150.

The movement of user's hand 150 towards mobile device 110 can be determined based on results of an analysis of contextual data obtained from various sensors and input devices (not specifically illustrated) located on mobile device 110. In some embodiments, the contextual data to be analyzed can be obtained from a wearable device (not illustrated) worn by the user, or from external sensors, cameras, and the like. Regardless of exactly how the contextual data is obtained, analysis of the contextual data can be used to control holographic projectors 115 to project one or more holographic objects to a location that is predetermined distance 132 from user's hand.

The predetermined distance from the user's hand can be obtained from a default configuration file, obtained directly from user-preferences, determined based on historical interactions of the user with holographic objects, established using an offset determined by analyzing contextual data, and then modifying a user preferred distance, selecting a user-preferred distance from a table linking preferred distances to particular contextual scenarios, or the like. In at least one embodiment, the predetermined distance can be modified based on user interaction with currently projected holographic objects. For example, if the user "beckons" the objects closer by performing a particular hand gesture, the plane of projection can be moved closer to the user. Similarly, a hand motion indicating a "pushing away" of the holographic objects can cause the holographic objects to be moved further way from the user than indicated by the predetermined distance. "Beckoning" and "pushing away" are considered, in at least one embodiment, to be considered interaction with the holographic objects. In other embodiments, these motions can be considered contextual data and can be used to adjust the predetermined distance.

Note that in the illustrated embodiment, the location of the holographic objects is determined based on the location of user's hand 150, and is not a set distance from mobile device 110. Projecting the holographic objects to a variable distance from the mobile device, but instead using a predetermined distance from the user's hand, improves current display technologies by allowing a user to interact with application icons, even when the user's distance to the mobile device is variable. The applicant is not asserting that this particular improvement is the only improvement over conventional methods, devices, and systems, but merely provides this disclosure as one example of how various embodiments can improve current display techniques.

Figure 2:
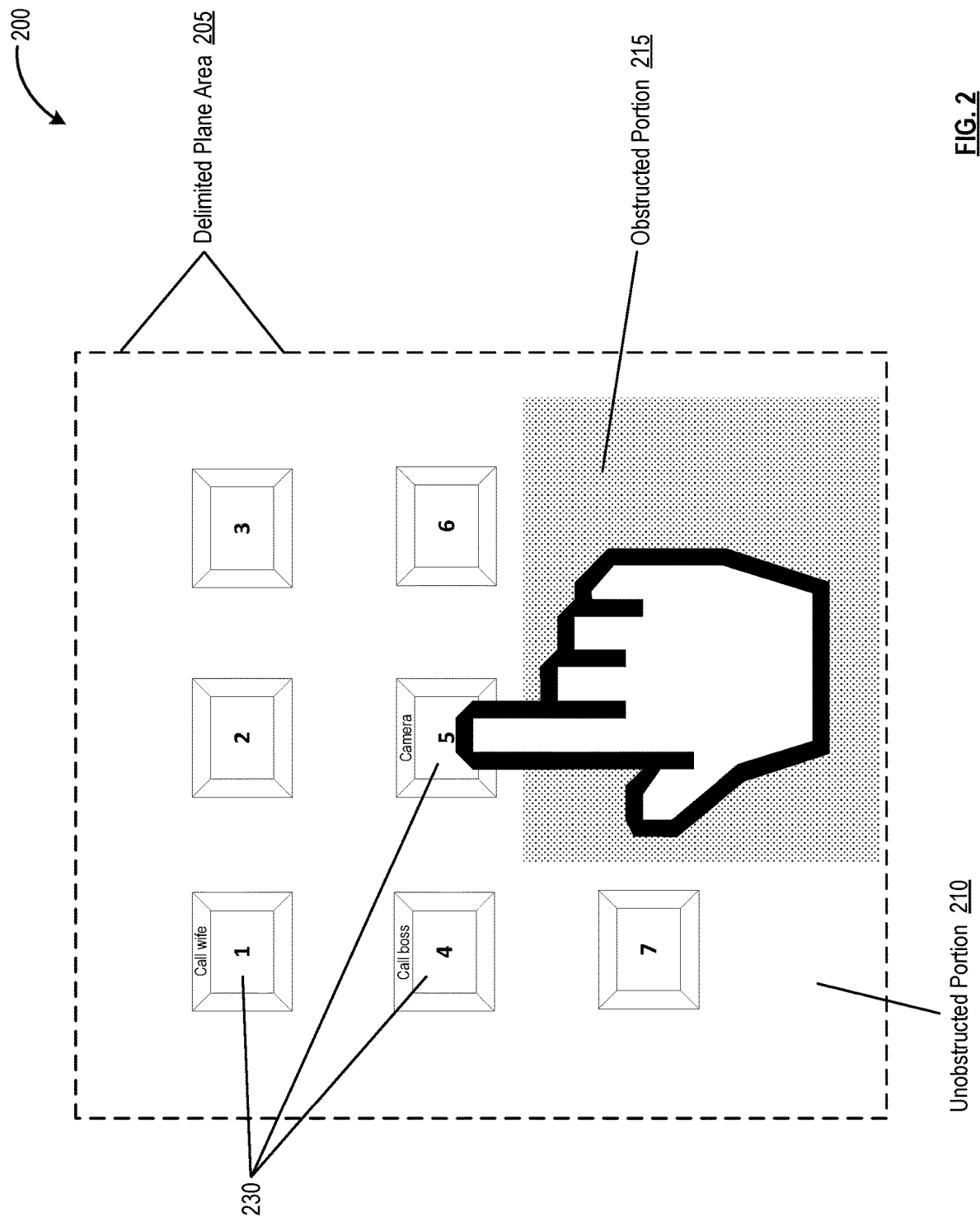
FIG. 2 is a diagram illustrating projecting a group of holographic objects to avoid an obstructed portion of a delimited plane area, in accordance with various embodiments of the disclosure.

Referring next to FIG. 2, a diagram 200 illustrating projecting a group of holographic objects to avoid an obstructed portion of a delimited plane area will be discussed in accordance with various embodiments of the disclosure. As illustrated in FIG. 2, holographic objects 230 are projected into a delimited plane area 205. Note that holographic objects 230 are displayed in unobstructed portion 210 of delimited plane area 205, but no objects are displayed in obstructed portion 215 of delimited plane area 205.

The size and shape of delimited plane area 205 can be determined based on a distance of delimited plane area 205 from the holographic projectors projecting the holographic objects 230. Delimited plane area 205 to be arbitrarily shaped, or at least shaped in into non-symmetrical polygons or otherwise. In some such embodiments, obstructed portion 215 can be considered to be outside of delimited plane area 205. In some such embodiments, the determination of the shape of delimited plane area 205 is determined to exclude obstructed portion 215.

The size of delimited plane area 205 can be set, in whole or in part, based on user preferences, user history, by default, based on results of an analysis of contextual data including a size and shape of obstructed portion 215, based on a size of holographic objects 230, based on a number of holographic objects to be projected, based on hardware or software constraints, or the like.

The size and shape of the obstructed portion 215 can be determined based on contextual data indicating environmental obstructions, distance from the holographic projectors, an angle of the user or the user's hand relative to the holographic projectors, based on the user's historical interactions with holographic objects, or the like.

For example, in the illustrated embodiments, holographic objects 230 can represent numbers on a keypad. A contextual analysis may indicate that the user is most likely going to return a phone call from his boss, because the user just finished listening to voicemail messages. The user moves his hand towards his phone, which is located on a nearby table. By analyzing contextual data obtained from the phone's camera, directional microphone, and data from a smart watch being worn by the user, the phone can determine that a portion of delimited plane area 205 is likely to be blocked by the user's hand. Based on the contextual analysis indicating the size and location of obstructed portion 215, the position of the user's hand, the angle at which the user is likely to be viewing the holographic objects, and the likelihood that the user wants to return a phone call from his boss, the phone selects the keypad dialing icons 1-7 for display in unobstructed portion 210. This will allow the user to select dialing icon 4.

In other embodiments, the results of the contextual analysis could indicate that it is important to project holographic objects 230 representing different dialing icons. In yet further embodiments, the user's phone could determine that all dialing icons should be presented in unobstructed portion 210, and could scale the size of holographic objects 230, or scale the size of delimited plane area, so that all 9 numbers on a keypad are projected within the unobstructed portion 210.

In yet other embodiments, holographic objects 230 do not necessarily represent numbers on a keypad, but instead represent application icons associated with the seven, highest ranked applications installed on, or otherwise available from, the user's phone. In some such embodiments, holographic objects 230 can be a grouping of icons selected by the phone based on results of analysis of contextual data. If the user declines to interact with the holographic objects 230, or interacts with holographic objects 230 in a way which indicates that different or additional holographic objects should be projected, a next most highly ranked set of applications can be displayed. In some embodiments, one or more of the holographic objects 230 can include a "next" or "previous" object, one or more "move in" or "move away" objects, or the like.

Figure 3:
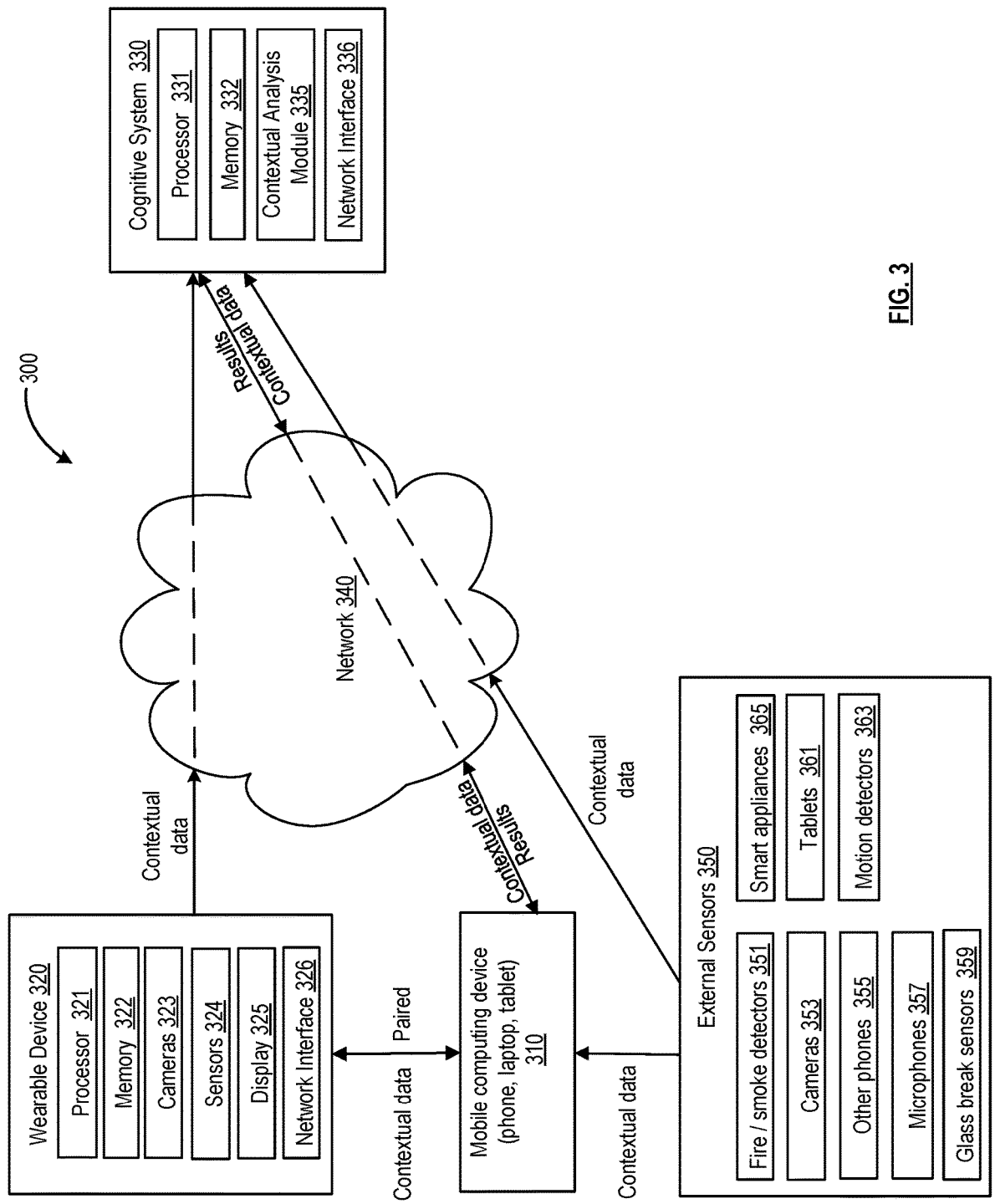
FIG. 3 is a schematic block diagram of a system including a mobile computing device and a remote cognitive system, in accordance with various embodiments of the disclosure.

Referring next to FIG. 3, a schematic block diagram of a system 300 including a mobile computing device and a remote cognitive system will be discussed in accordance with various embodiments of the disclosure. System 300 includes mobile computing device 310 connected to wearable device 320, external sensors 350, and cognitive system 330 directly or through communication network 340. For example, mobile computing device 310 is illustrated as being connected to wearable device 320 in a pairing type relationship using, for example, a Bluetooth® communications protocol. Mobile computing device 310 is connected to external sensors 350 using a dedicated wireless or wired connection, and to cognitive system 330 through communication network 340. In addition to direct connections, wearable device 320 and external sensors 350 can communicate with mobile computing device 310 via any of various local networks (not explicitly illustrated).

Mobile computing device 310 can be a mobile phone, such as a smart phone, a tablet, a laptop computer, or another computing device that provides applications. As used herein, the term "application" refers to computer implemented functionality that provides audio, video, or text-based communication services; social networking services; audio or video streaming services; word processors, spreadsheets, presentation software, calendars, or other productivity tools; editing, capturing, storing, or retrieving video, still pictures, or audio content; and the like. Additional details regarding the structure of mobile computing device 310 are discussed subsequently with respect to FIG. 4.

Wearable device 320 includes a processor 321, memory 322, camera 323, sensors 324, display 325, and network interface 326. Wearable device 320 can be implemented as a "smart watch," a bracelet, pendant, fob, hat, eyeglasses, or other similar device configured to be carried on or about the body of a user. Wearable device 320 obtains contextual information, and provides that contextual information to mobile computing device 310, cognitive system 330, or both. In various embodiments, sensors 324 include sensors capable of capturing data indicative of wrist movements, gestures and relative direction towards mobile computing device 310; sensors used to capture a user's current biometric data such as heart rate or pulse as measure of current health status, and sensors to capture temperature, presence of smoke or other environmental conditions.

External sensors 350 includes detector 351, such as fire/smoke/carbon monoxide detectors; one or more cameras 353, which can be standalone cameras or included in other devices; other phones 355 and tablets 361, including smart phones, etc. other than the mobile computing device 310; microphones 357, which can be standalone microphones or included in other devices; glass break sensors 359 and motion detectors 363, which are included in many home security systems; and one or more smart appliances 365, which themselves include various sensors such as cameras and microphones, pressure switches, etc., and which may report sensor data to a monitoring system (not illustrated), cognitive system 330, or mobile computing device 310. This list of external sensors 350 is not intended to be exhaustive.

Cognitive system 330 includes processor 331, memory 332, contextual analysis module 335 and network interface 336. Using network interface 336, cognitive system 330 can receive contextual data from mobile computing device 310, wearable device 320, external sensors 350, or any combination of these and other sources of contextual data or information. Contextual analysis module 335 can fully or partially analyze the contextual data received from the various sources, and provide results of the analysis to mobile computing device 310. In at least one embodiment, cognitive system 330 performs ongoing analysis of users activities learned from mobile device location and movements, calendar, voice passive listening, historical usage patterns of mobile apps and other contextual data. Embodiments of cognitive system 330 also predict future applications likely to be accessed by a user based on context of location, interaction subject, and historical usage patterns. Additionally, cognitive system 330 can rank and cluster mobile applications that will be projected as 3D holograms.

In some embodiments, cognitive system 330 cooperates with mobile computing device 310 to evaluate contextual data to determine direction, speed, location, angle, etc. of a user's body or hand; to identify a size, shape, and location of a delimited plane area onto which holographic objects are to be projected; to select particular objects, icons, etc. to be projected to the user; to prioritize and group holographic objects; to identify emergency situations, and the like. In other embodiments, cognitive system 330 performs the analysis independent of mobile computing device 310, and transmits results of the analysis to mobile computing device 310 for action. In some implementations, mobile computing device 310 analyzes the contextual data independent of cognitive system 330. In further embodiments, a user of mobile computing device 310 is given the choice of whether some or all of the analysis is performed by cognitive system 330 or locally on mobile computing device 310. If the processing and storage resources available to mobile computing device 310 locally are insufficient, some or all of the analysis can be offloaded to cognitive system 330.

In an example of operation, mobile computing device 310 obtains contextual data from built in sensors, such as cameras, microphones, etc. This contextual data can be supplemented by mobile computing device 310 contextual data obtained by wearable device 320 or external sensors 350. The contextual data can include information indicating the identity of the user, the location of the user, movement of the user's hand, or the like. For example, an image of the user, a voice of the user, background sounds or images captured by cameras and microphones, ambient light levels, location data, characteristic movement patterns of the user's hand, etc. Mobile computing device 310 can analyze the contextual data to determine that the user has permission to access mobile computing device 310, and that the user's hand is 3 feet away from mobile computing device and moving towards mobile computing device 310 at a rate, in a pattern, or the like, indicating that the user is reaching to interact with mobile computing device 310.

In response to detecting movement of the user's hand towards mobile computing device 310, holographic objects corresponding to applications provided by mobile computing device 310, for example icons representing particular applications installed on mobile computing device 310, can be projected to a predetermined distance from the user's hand. User interactions with one or more of the projected holographic objects can be used to trigger functionality in a manner similar to the way application functionality is triggered by user interaction with icons displayed on a fixed screen.

In some instances, the determination of user authorization can be made based on user interaction with one or more holographic objects, such as selecting one or more icons in a pre-established pattern that indicates user authorization or identity. Authorization or identity can also be established based on a combination of one or more of visual, audio, biometric, and historical user movements or actions. In at least one embodiment, more than one user has an established profile associated with a single device. Each of these profiles can be further associated with a particular set of access and authorization parameters, as well as user history profiles and preferences. In some embodiments, if a user is not recognized as being authorized to access a particular device, that user can be provided with "guest access," which may allow limited access to one or more applications, including emergency related applications, using default parameters.

Figure 4:
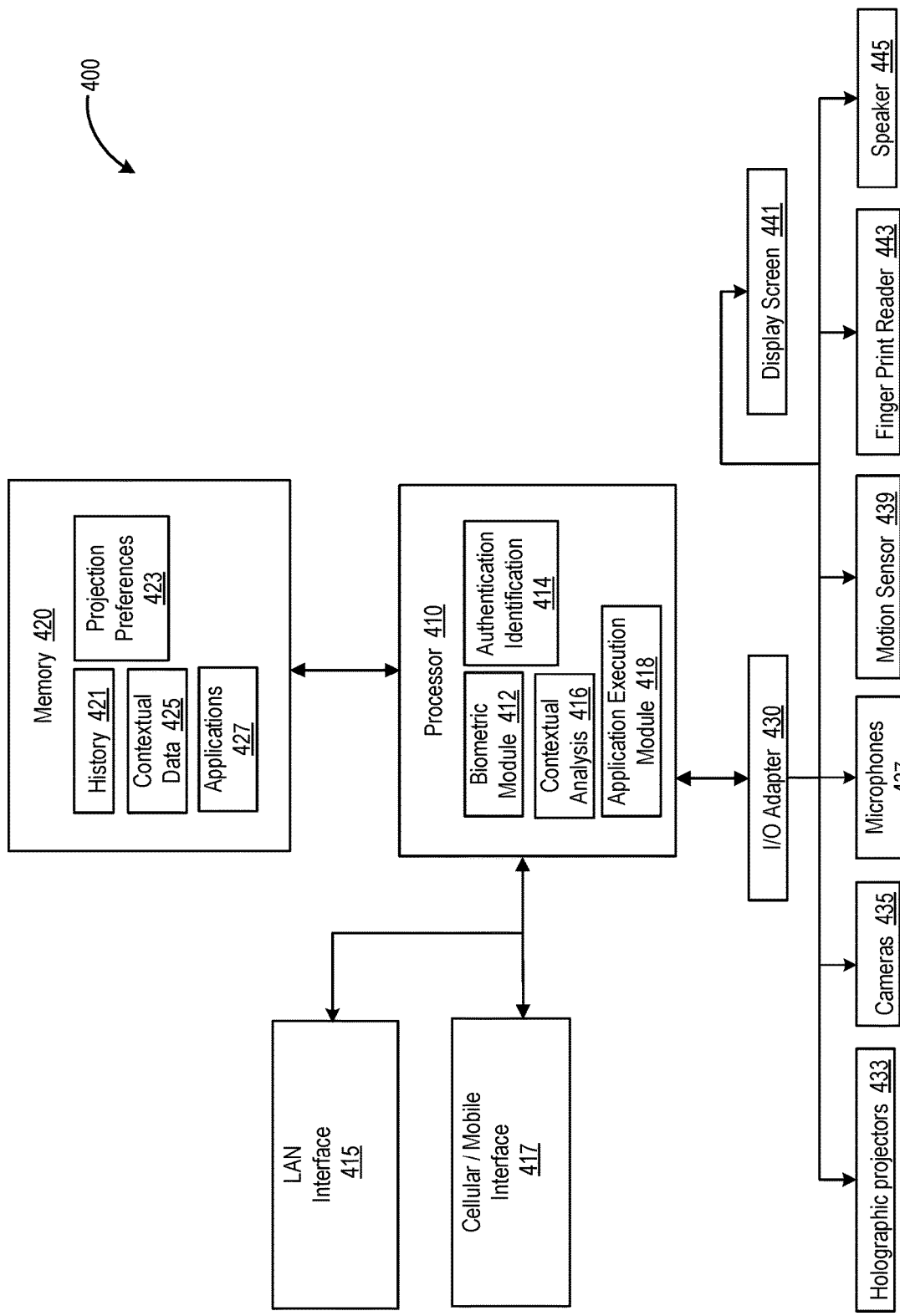
FIG. 4 is a schematic block diagram of a computing device, in accordance with various embodiments of the disclosure.

Referring next to FIG. 4, a schematic block diagram of a computing device 400 will be discussed in accordance with various embodiments of the disclosure. Computing device 400 includes processor 410, memory 420, Local Area Network (LAN) interface 415, which can be wired, wireless, or both, and can include support for Personal Area Networking such as Bluetooth®; cellular/mobile carrier interface 417 configured to communicate with one or more telephone carrier networks using any of various mobile telephony and data telecommunications protocols; input/output (I/O) adapter 430 connected to holographic projectors 433, camera 435, microphone 437, motion sensor 439, display screen 441, fingerprint reader 443, and speaker 445.

Processor 410 is configured to implement a biometric module 412, an authentication/identification module 414, a contextual analysis module 416, and one or more application execution modules, such as application module 418. Biometric module 412 can receive data input from various devices, for example, speaker 445, camera 435, or fingerprint reader 443, and process that input to provide biometric identification of a user. Authentication/identification module 414 determines access permissions for identified users. In some case, a particular biometric identification is sufficient to act as authentication, and authentication/identification module 414 need only compare the identity of the user to a list, table, or other data structure linking identified users with particular access permissions. In other embodiments, biometric identification may be insufficiently trustworthy to permit a user access without a secondary authorization or identification. For example, entry of a password, use of a secondary authentication device, or multiple biometric identifications, such as visual and audio biometric identifications, may be used.

Application module 418 can execute one or more applications resident on, or accessible through, computing device 400, for example, applications 427 stored in memory 420. Individual applications may be executed by different application modules, or multiple applications can be executed by a single application module, such as application module 418.

Contextual analysis module 416 receives contextual data from any of various I/O devices included in computing device 400, from external devices via LAN interface 415, from cellular/mobile carrier interface 417, or from another communications interface (not illustrated) that permits external devices to communicate with computing device 400. Contextual analysis module 416 can also retrieve history information 421, projection preferences 423, contextual data 425, and data stored by one or more applications, from memory 420.

Contextual analysis module 416 can analyze the contextual data, and use the results of that analysis to determine a location and direction of movement of a user's hand, determine a location, size and shape of a holographic display area, predict which applications a user is likely to be interested in accessing, select, rank, and group application icons or other objects for holographic projection, identify potentially obstructed viewing areas, which can be avoided during projection of holographic objects; identify emergency situations, and make other determinations affecting the projection of holographic objects towards the user.

In some embodiments, contextual analysis can perform partial preprocessing of contextual data, including compressing, encrypting or partially analyzing contextual data contextual data prior to sending the contextual data to an external cognitive system for further processing. The contextual analysis module may determine the amount of preprocessing to perform based on user preferences, available network bandwidth, available processing resources, amount of contextual data to be processed, or the like.

In some such embodiments, contextual analysis module receives analysis results from the external cognitive system, and uses those results to make relevant determinations, such as which objects to project holographically, projection coordinates, and the like. In other implementations, the results received from the external cognitive system makes the actual determinations and includes those determinations in the results sent to the contextual analysis module. For example, results of the cognitive systems analysis of the contextual data may include information such as application icons selected for projection; projection coordinates and offsets; application rankings and groupings; holographic object sizes, groupings and arrangement adjustments determined based on potential obstructed portions of delimited plane area, and the like. In some of such implementations, contextual analysis module 416 can provide local adjustments or overrides to results received from an external cognitive system.

Figure 5:
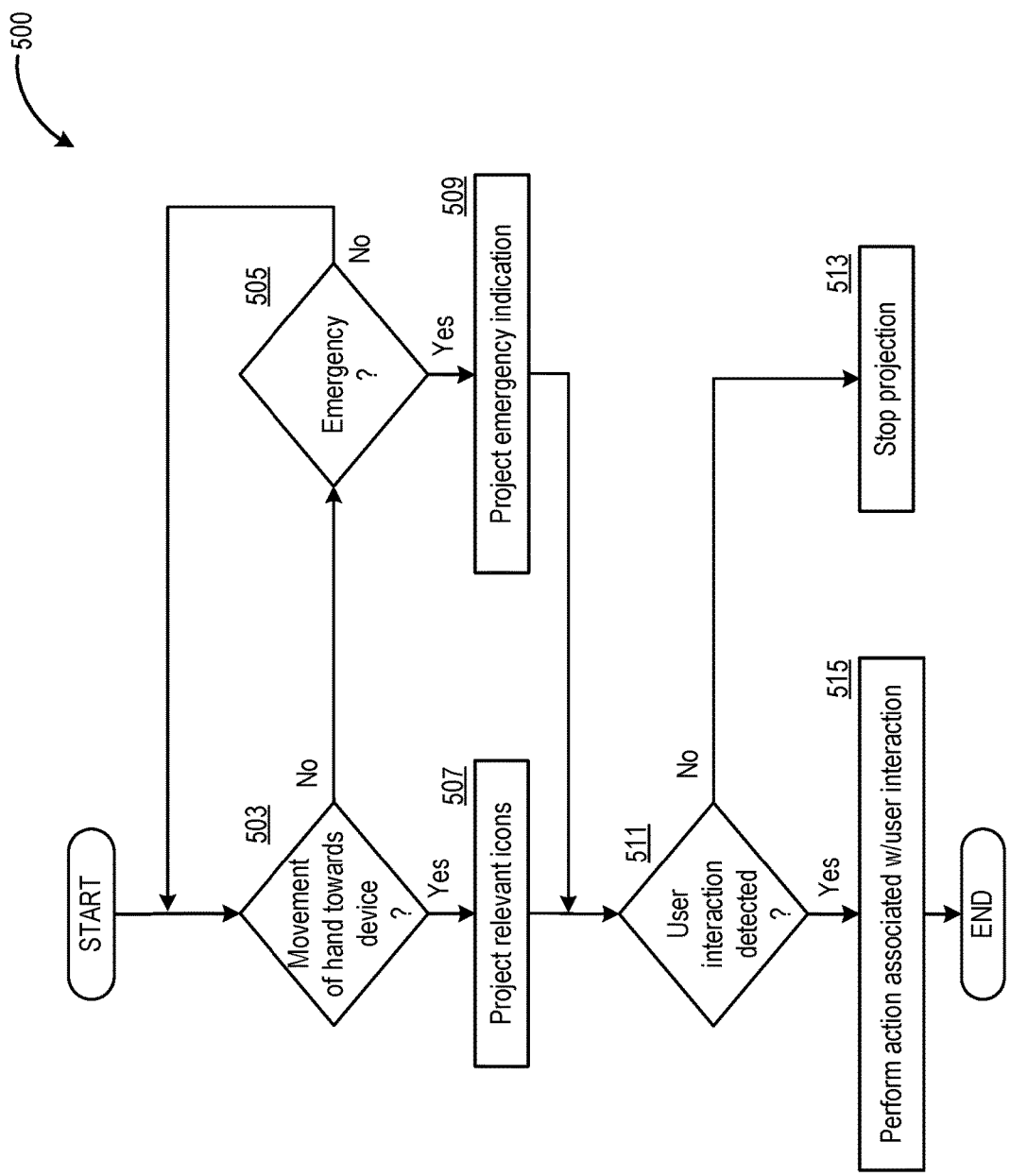
FIG. 5 is a flow diagram of a method, in accordance with various embodiments of the disclosure.

Referring next to FIG. 5, a flow diagram of a method 500 will be discussed in accordance with various embodiments of the disclosure. As illustrated by block 503, results of a contextual analysis can be evaluated to determine whether a user of the mobile computing device is moving his hand towards the device. For example, cameras mounted on the mobile computing device can collect contextual data in the form of images, and cache a predetermined number of those images in device memory. The mobile device can evaluate those images against immediately subsequent and previous images to identify movement of the user's hand towards the device. External contextual data, for example motion sensor data from a smart watch being worn by the user, can be transmitted from the smart watch to the mobile computing device, and the mobile computing device can use the external contextual data, either alone or in conjunction with the images captured by the mobile computing device, to make a determination regarding the location and movement of the user's hand.

As illustrated by block 505, if the user's hand is not moving towards the mobile computing device, the results of the contextual analysis can be checked for an indication that an emergency situation is in progress. For example, a smart watch including a heart rate sensor, a blood pressure monitor, an oxygen sensor, a microphone, a camera, or other sensors, can be used to gather contextual data related to user health, and provide that contextual data to the mobile device, to the external contextual system, or both. If the results of the analysis of the contextual data can indicate that the user is experiencing an irregular heartbeat and low oxygen level, the mobile computing device can make the determination that an emergency situation exists.

If it is determined at block 505 that an emergency situation exists, the mobile computing device can project an emergency indication towards the user, as illustrated by block 509. The location at which to project the emergency indication can be determined based on analysis of contextual information that indicates a current position of the user. For example, if a series of images captured by the mobile device, a wearable device carried by the user, other external sensors, or some combination thereof indicate that the user has collapsed beside a treadmill during exercise, the mobile device can project an emergency indication, for example a holographic "beacon", above the user's estimated location to aid first responders in finding the collapsed user. The emergency indication can include an indication of the type of emergency, e.g. a heart attack, which can also assist first responders in performing their assessments.

In some embodiments, projecting the emergency indication can be performed in conjunction with automatically activating an emergency application, such as a call to emergency services. In yet further embodiments, projecting the emergency indication can include projecting a holographic icon associated with an application available through the mobile computing device, which can allow a user to cancel an automated emergency call, or perform some other action.

If no movement of the user's hand towards the mobile device is detected at block 503, and no emergency is identified at block 505, method 500 returns to block 503.

As illustrated by block 507, if movement of the user's hand towards the mobile device is detected at block 503, relevant holographic icons or other objects are projected towards the user's hand, to allow the user to interact with the holographic objects from a distance, thereby allowing the user to interact a mobile computing device that may otherwise be out of the user's reach. These holographic icons can be selected, grouped, and projected based on results of an analysis of contextual data obtained from sensors and input devices included on the mobile computing device, from sensors and input devices from sensors and input devices external to the mobile device, or some combination thereof. The holographic icons are, in various embodiments, projected using holographic projectors included in the mobile computing device, but in some embodiments can be projected by holographic projectors external to, but controlled directly or indirectly by, the mobile computing device.

As illustrated by block 511, the mobile computing determines whether the user interacts with the projected holographic objects. As illustrated at block 513, if no user interaction is detected within a given period of time, the projection of the currently displayed holographic objects can be discontinued. As illustrated by block 515, in response to detecting user interaction by block 511, the mobile computing device can perform the action associated with the user interaction. For example, cameras, motion sensors, and other internal and external devices can be used to detect interaction of a user's hand, or a particular sequence of hand motions, an in response launch an application associated with the projected holographic object.

Although movement of a user's hand is the focus of most of the discussion, in some embodiments movement of another body part of the user, for example the user's foot, eyeball, elbow, knee, chin, torso, or the like, can be used in place of, or in addition to, movement of the user's hand. Similarly, voice interaction with projected objects is also within the scope of this disclosure, where voice interaction can include issuing commands to the mobile computing device by reference to projected holographic objects. For example, "Choose object one."

Figure 6:
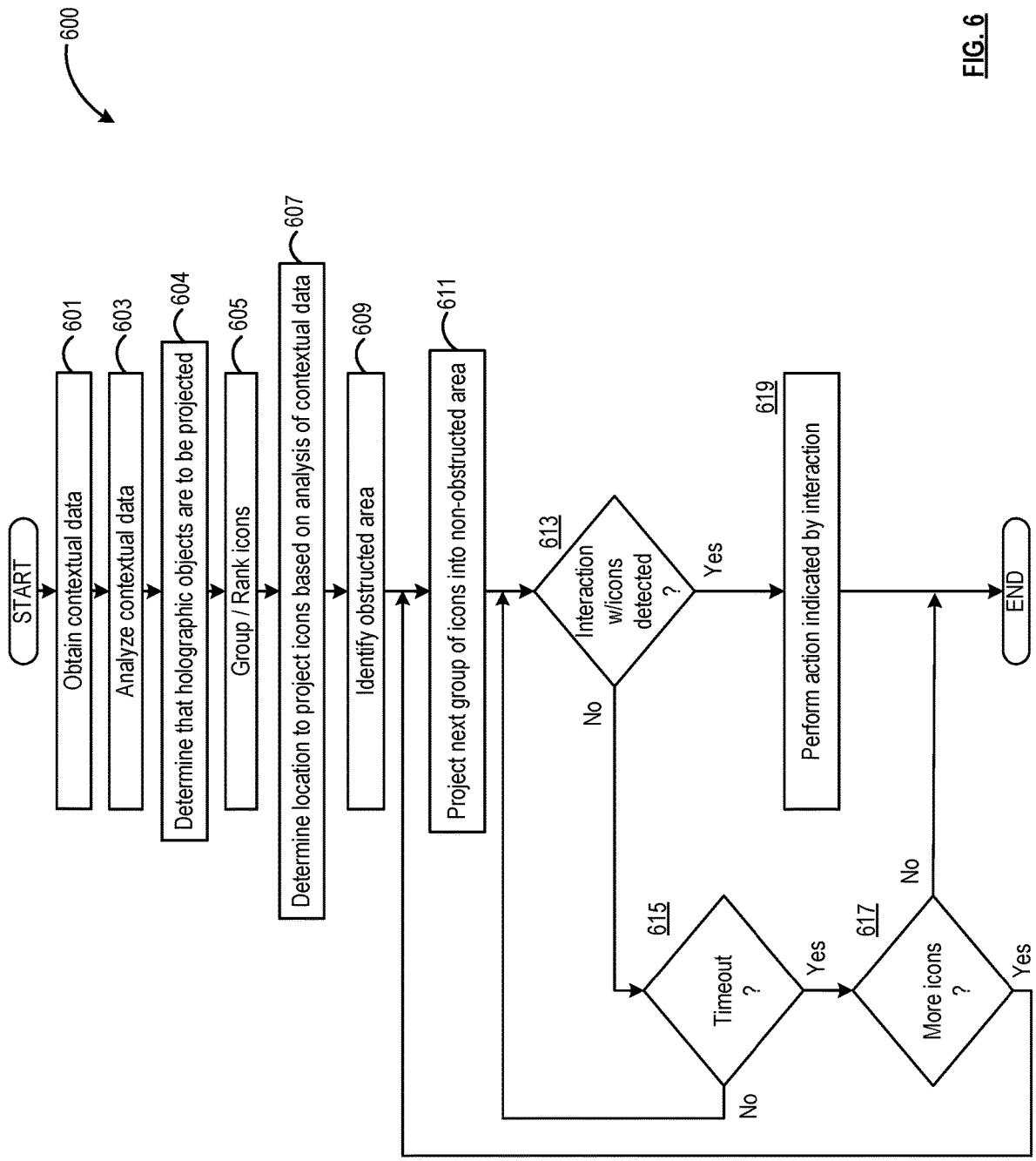
FIG. 6 is a flow diagram of another method, in accordance with various embodiments of the disclosure.

Referring next to FIG. 6, a flow diagram of a method 600 will be discussed in accordance with various embodiments of the disclosure. As illustrated at block 601, contextual data is obtained by one or more devices. For example, contextual data can be obtained by a computing device tasked with analyzing the contextual data. This computing device can include, for example, a user's smart phone placed on a table in the same room as the user, a remote cognitive analysis system, a device controlling various "smart home" devices. The contextual data can be collected from sensors included on the computing device, sensors included in a wearable device capable of transmitting the contextual data to the computing device, sensors included in standalone smart devices and appliances capable of communicating with the computing device, or the like. In various embodiments, a portion of the contextual data, including historical interaction data, images, and background sounds, can be obtained by one device, while other contextual data, including motion sensor data, positioning data, and biometric measurements, is obtained from one or more other devices.

As illustrated by block 603, the contextual data is analyzed by one or more computing devices to generate contextual analysis results. The results obtained from analyzing the contextual data can include, but are not limited to, results indicating the following: determining a priority of applications associated with holographic objects, and by extension the priority in which the holographic objects are to be displayed; a preferred grouping of holographic objects; movements of a user, including movements of limbs and digits towards a location associated with a computing device controlling the display of the holographic objects; and identification of potentially obstructed viewing areas due to a user's location, viewing angle, or physical obstructions, such as furniture.

The analysis can include comparing contextual data to various threshold values, which can be established by various applications, variable or fixed user preferences, user interaction histories obtained from either or both a current computing device and one or more other computing devices, and the like. The analysis of contextual data can be partially or fully performed local to the mobile computing device, at an external contextual analysis system, or both.

As illustrated by block 604, the computing device makes a determination that one or more holographic objects are to be projected towards the user, based on results of the contextual analysis. This determination can be made based on a user's voice command (e.g. "Change radio station."); an application alert or notification (e.g. text message received); historical user interactions in similar environmental contexts (e.g. user normally does not respond to email messages from noon to 1 pm); movement of the user's hand towards a tablet device; or the like. In at least one embodiment, movement of the user's hand in the direction of the mobile device can be used as a signal to initiate contextual predicted application be projected to user's hand.

As illustrated by block 605, holographic objects, such as icons associated with applications available through the computing device, can be grouped and ranked based on the contextual analysis. For example, consider a case where the results of the contextual analysis indicate that the user is walking on a treadmill, and the user's smart phone, which is located on a table across the room from the treadmill, begins to ring. The computing device can determine that the user will most likely want to interact with one of the available communication applications available on the smart phone, and choose one or more icons associated with a telephone or messaging application to project towards the user on the treadmill.

In another example, movement of a user's hand towards the computing device in the context of sitting at his office desk, can result in the computing device assigning a high rank to particular office productivity applications, next highest ranks to phone, email and messaging programs, third highest ranking to game applications, and so on.

As illustrated at block 607, the computing device can determine, based on the contextual data, the location to which the holographic objects are to be projected. In at least one embodiment, the location will be in a planar viewing area a fixed distance from the current location of the user's hand. This fixed distance from the user's hand can be set by default, based on user preferences, based on historical interaction data, or the like. In various embodiments, the fixed distance associated with one context is different than the fixed distance associated with a different context. For example, the user may specify that when located in his office, the fixed distance is to be 1 inch from the tip of the user's index finger, while the specified distance in the context of the user's home is 3 inches. The user specified or default distance can be modified automatically based on context and historical interactions, based on obstructions to projection, or the like. In at least one embodiment, the top ranked application will be placed in the middle, aligned with finger direction, and remaining applications in a group will be plotted around the highest ranked application.

As illustrated by block 609, obstructed areas can be identified based on the contextual data. For example, if the contextual data indicates that the user is seated at a desk, the angle at which the user interacts with the holographic objects can be different than the angle used in the context of standing by the door. Consequently, there may be different areas obstructed from the user's potential view due to his hand position, due to a desk lamp, or the like.

As illustrated by block 611, a group including one or more icons, which were selected and grouped according to contextual data, can be projected to the location determined at block 607, and subject to any obstructed areas determined at block 609. As illustrated by block 613, the computing device monitors contextual data, for example camera inputs, transducers and motion sensors in wearable device carried by the user, etc., to determine whether the user interacts with the projected holographic objects. User interactions can include verbal interactions, movement of various parts of the user's body, specific sequences of motions or hand gestures, or the like.

As illustrated by block 615, if no interaction is detected, and a timeout period has not expired, the holographic objects continue to be displayed, and block 613 continues to monitor for interactions with the displayed objects.

If, no interaction is detected, and a timeout period has expired, a check made at block 617 to determine if there are more icons to be displayed. For example, in the office context, if the user does not interact with displayed icons with in a response time threshold, which may be configurable, and there is more than one group of objects to be projected, method 600 returns to block 611, where the next lower-ranked group of holographic objects is to be displayed. Otherwise, method 600 ends.

As illustrated by block 619, if user interaction with the displayed holographic objects is detected at block 619, the action indicated by the user interaction is performed by the computing device. For example, if the user selects and activates a displayed holographic icon, the computing device can initiate the same action that would be initiated if the user had selected and activated a similar icon displayed on a touch screen of the computing device. If the user interaction indicates a preference for display of additional or different holographic objects, or a repositioning of the holographic objects, the computing device can perform the appropriate action.

In at least one embodiment, if the user does not select the displayed icons, and continues to move their finger, the mobile device will project the next likely predicted set of application icons towards user's fingers. Even if user does not select any icon, then user can directly select from mobile device, and system can be trained automatically based on the contextual mobile application usage pattern.

Various embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
responsive to detecting, by one or more processors, movement of a hand of a user associated with a computing device towards the computing device, obtaining, by the one or more processors, contextual data associated with the user, wherein the contextual data comprises a current location of the user relative to the computing device and an overall position of the user;
determining, by the one or more processors, an angle of the hand of the user relative to at least one holographic projector based on an analysis of the contextual data;
selecting, by the one or more processors, one or more application icons provided by the computing device based on (1) the analysis of the contextual data and (2) historical usage patterns of the user of a plurality of applications on the computing device; and
projecting, by the one or more processors, one or more holographic objects representing the one or more application icons into a viewable area located a predetermined distance in front of at least one fingertip of the hand of the user, wherein the predetermined distance is determined based on historical interactions of the user with respective holographic objects, wherein a size, shape, and location of the viewable area are based on the analysis of the contextual data.

2. The method of claim 1, further comprising:
obtaining, by the one or more processors, at least a portion of the contextual data from one or more input devices included on a mobile communications device.

3. The method of claim 1, further comprising:
grouping, by the one or more processors, a plurality of holographic objects associated with the plurality of application icons into at least one cluster;
identifying, by the one or more processors, a delimited plane area located the predetermined distance from the hand of the user;
identifying, by the one or more processors, an obstructed portion of the delimited plane area based on the contextual data, the obstructed portion determined to be blocked from viewing by the user; and
projecting, by the one or more processors, the at least one cluster into an unobstructed portion of the delimited plane area.

4. The method of claim 3, further comprising:
grouping, by the one or more processors, the plurality of holographic objects associated with the plurality of application icons into at least a first cluster and a second cluster, the first cluster and the second cluster including at least one different holographic object;
projecting, by the one or more processors, the first cluster into the unobstructed portion of the delimited plane area;
determining, by the one or more processors, user interaction with the first cluster; and
projecting, by the one or more processors, the second cluster, in place of the first cluster, based on the user interactions with the first cluster.

5. The method of claim 1, further comprising:
obtaining, by the one or more processors, at least a portion of the contextual data from a wearable user device communicatively coupled to the computing device.

6. The method of claim 1, further comprising:
transmitting, by the one or more processors, the contextual data associated with the user from the computing device that is local to the user to an external computing device configured to perform the analysis of the contextual data and transmit the results of the analysis to the computing device.

7. The method of claim 1, further comprising:
determining, by the one or more processors, based on the results of the analysis of the contextual data, that the user is experiencing an emergency; and
wherein the one or more holographic objects includes a predefined object associated with an emergency notification application.

8. A computer program product comprising:
one or more computer readable storage media and program instructions stored on the one or more computer readable storage media, the program instructions comprising:
responsive to detecting movement of a hand of a user associated with a computing device towards the computing device, program instructions to obtain contextual data associated with the user, wherein the contextual data comprises a current location of the user relative to the computing device and an overall position of the user;
program instructions to determine an angle of the hand of the user relative to at least one holographic projector based on an analysis of the contextual data;
program instructions to select one or more application icons provided by the computing device based on (1) the analysis of the contextual data and (2) historical usage patterns of the user of a plurality of applications on the computing device; and
program instructions to project one or more holographic objects representing the one or more application icons into a viewable area located a predetermined distance in front of at least one fingertip of the hand of the user, wherein the predetermined distance is determined based on historical interactions of the user with respective holographic objects wherein a size, shape, and location of the viewable area are based on the analysis of the contextual data.

9. The computer program product of claim 8, further comprising:
program instructions to obtain at least a portion of the contextual data from one or more input devices included on a mobile communications device.

10. The computer program product of claim 8, further comprising:
program instructions to group a plurality of holographic objects associated with the plurality of application icons into at least one cluster;
program instructions to identify a delimited plane area located the predetermined distance from the hand of the user;
program instructions to identify an obstructed portion of the delimited plane area based on the contextual data, the obstructed portion determined to be blocked from viewing by the user; and
program instructions to project the at least one cluster into an unobstructed portion of the delimited plane area.

11. The computer program product of claim 10, further comprising:
program instructions to group the plurality of holographic objects associated with the plurality of application icons into at least a first cluster and a second cluster, the first cluster and the second cluster including at least one different holographic object;
program instructions to project the first cluster into the unobstructed portion of the delimited plane area;
program instructions to determine user interaction with the first cluster; and
program instructions to project the second cluster, in place of the first cluster, based on the user interactions with the first cluster.

12. The computer program product of claim 8, further comprising:
program instructions to obtain at least a portion of the contextual data from a wearable user device communicatively coupled to the computing device.

13. The computer program product of claim 8, further comprising:
program instructions to transmit the contextual data associated with the user from the computing device that is local to the user to an external computing device configured to perform the analysis of the contextual data and transmit the results of the analysis to the computing device.

14. The computer program product of claim 8, further comprising:
program instructions to determine based on the results of the analysis of the contextual data, that the user is experiencing an emergency; and
wherein the one or more holographic objects includes a predefined object associated with an emergency notification application.

15. A computer system comprising:
one or more computer processors;
one or more computer readable storage media;
program instructions stored on the computer readable storage media for execution by at least one of the one or more processors, the program instructions comprising:
responsive to detecting movement of a hand of a user associated with a computing device towards the computing device, program instructions to obtain contextual data associated with the user, wherein the contextual data comprises a current location of the user relative to the computing device and an overall position of the user;
program instructions to determine an angle of the hand of the user relative to at least one holographic projector based on an analysis of the contextual data;
program instructions to select one or more application icons provided by the computing device based on (1) the analysis of the contextual data and (2) historical usage patterns of the user of a plurality of applications on the computing device; and
program instructions to project one or more holographic objects representing the one or more application icons into a viewable area located a predetermined distance in front of at least one fingertip of the hand of the user, wherein the predetermined distance is determined based on historical interactions of the user with respective holographic objects wherein a size, shape, and location of the viewable area are based on the analysis of the contextual data.

16. The computer system of claim 15, further comprising:
program instructions to group a plurality of holographic objects associated with the plurality of applications into at least one cluster;

program instructions to identify a delimited plane area located the predetermined distance from the hand of the user;

program instructions to identify an obstructed portion of the delimited plane area based on the contextual data, the obstructed portion determined to be blocked from viewing by the user; and program instructions to project the at least one cluster into an unobstructed portion of the delimited plane area.

17. The computer system of claim 16, further comprising:

program instructions to group the plurality of holographic objects associated with the plurality of application icons into at least a first cluster and a second cluster, the first cluster and the second cluster including at least one different holographic object;

program instructions to project the first cluster into the unobstructed portion of the delimited plane area;

program instructions to determine user interaction with the first cluster; and program instructions to project the second cluster, in place of the first cluster, based on the user interactions with the first cluster.

18. The computer system of claim 15, further comprising:

program instructions to obtain at least a portion of the contextual data from a wearable user device communicatively coupled to the computing device.

19. The computer system of claim 15, further comprising:

program instructions to transmit the contextual data associated with the user from the computing device that is local to the user to an external computing device configured to perform the analysis of the contextual data and transmit the results of the analysis to the computing device.

20. The computer system of claim 15, further comprising:

program instructions to determine based on the results of the analysis of the contextual data, that the user is experiencing an emergency; and wherein the one or more holographic objects includes a predefined object associated with an emergency notification application.

* * * * *